Aug. 6, 1929.  H. O. WENTZ  1,723,961
ROUGHING MILL ATTACHMENT
Filed March 14, 1923    3 Sheets-Sheet 1

H. O. Wentz
INVENTOR
BY Victor J. Evans
ATTORNEY

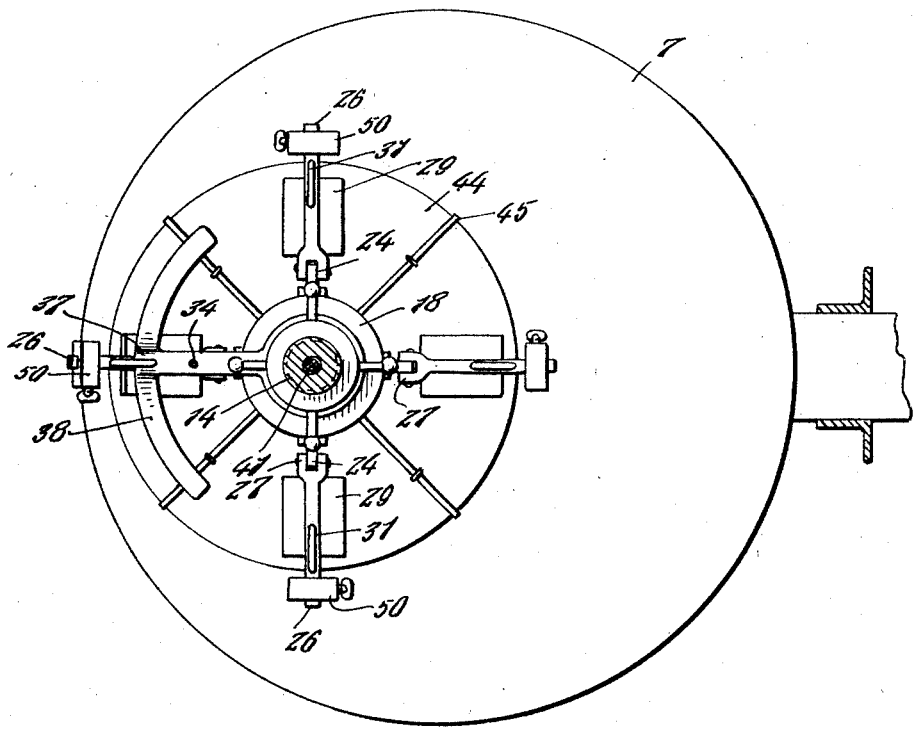
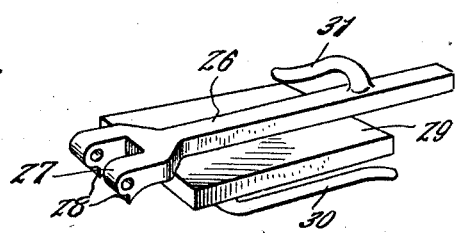
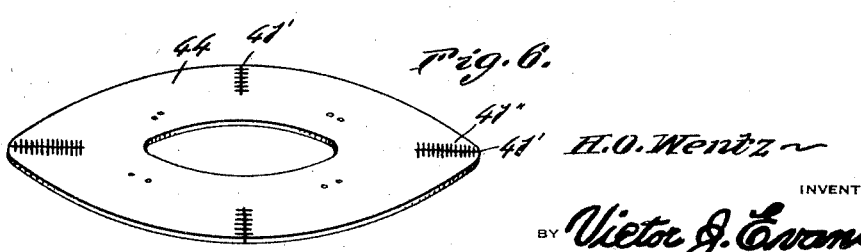

Aug. 6, 1929.  H. O. WENTZ  1,723,961
ROUGHING MILL ATTACHMENT
Filed March 14, 1928  3 Sheets-Sheet 3

H. O. Wentz, INVENTOR

BY Victor J. Evans, ATTORNEY

Patented Aug. 6, 1929.

1,723,961

UNITED STATES PATENT OFFICE.

HERBERT O. WENTZ, OF TIFFIN, OHIO.

ROUGHING-MILL ATTACHMENT.

Application filed March 14, 1928. Serial No. 261,516.

My present invention has reference to an attachment for roughing mills for grinding the edges of footed glass ware and has for its objects the provision of simple means whereby the edges of the glassware will be uniformly ground and consequently insuring the uniform height of the ware; means for adjusting the device to compensate for different sizes of glass ware, means for effectively protecting the operating parts of the device from the abradent which is delivered onto the roughing plate or table, means for protecting the remainder of the glassware should one of the same become broken, means for singly elevating the glassware after the grinding of the edge thereof to permit of the withdrawal of such glassware and the replacement of another ware to be ground, together with an element for insuring an even or undented surface to the roughing plate by the grinding operations.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 2 is a sectional view approximately on the line 2—2 of Figure 1.

Figure 5 is a perspective view of one of the ware holding members.

Figure 6 is a similar view of the protector disc.

Figure 1:
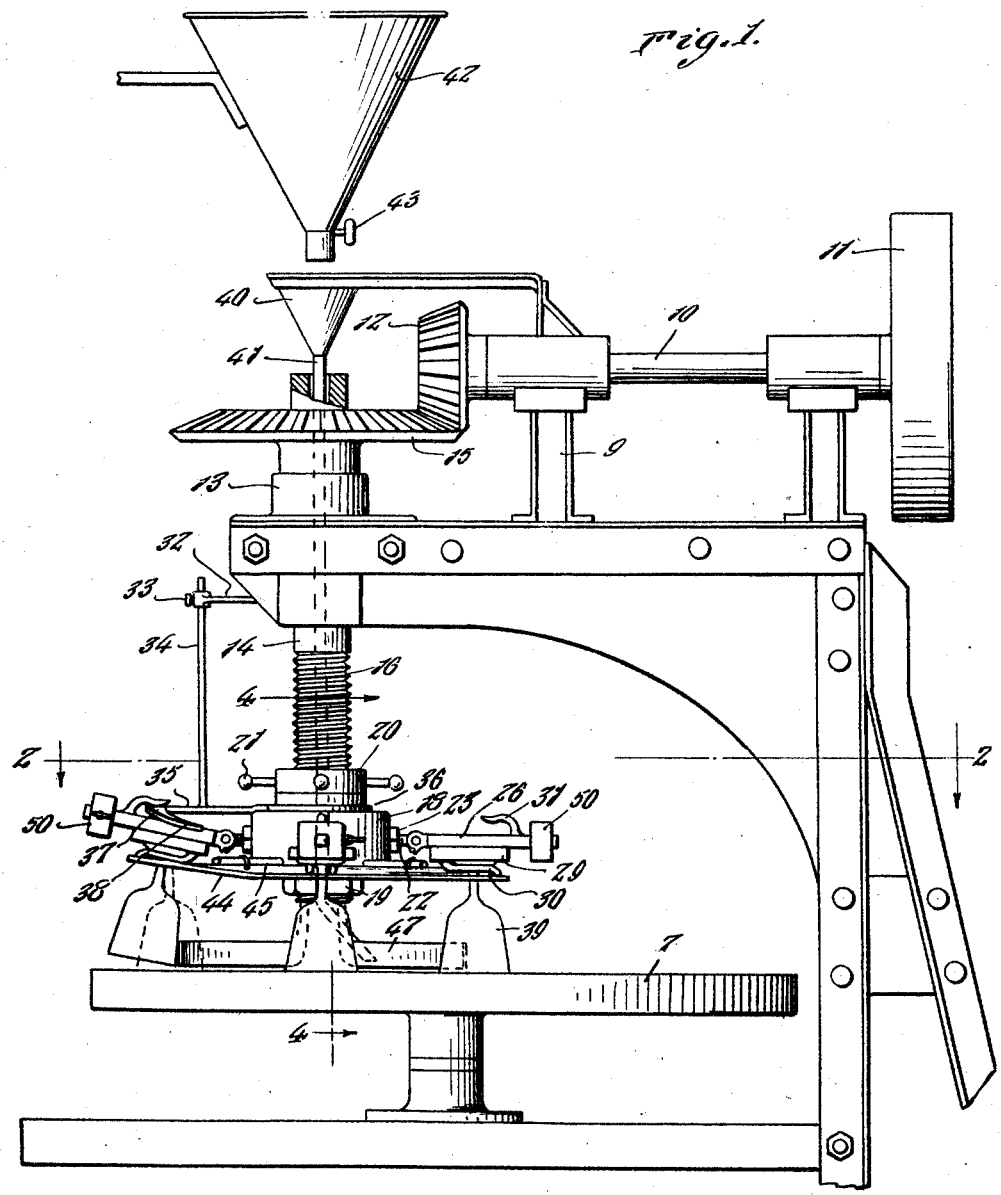
Figure 1 is a side elevation of my improvement.
Figure 3:
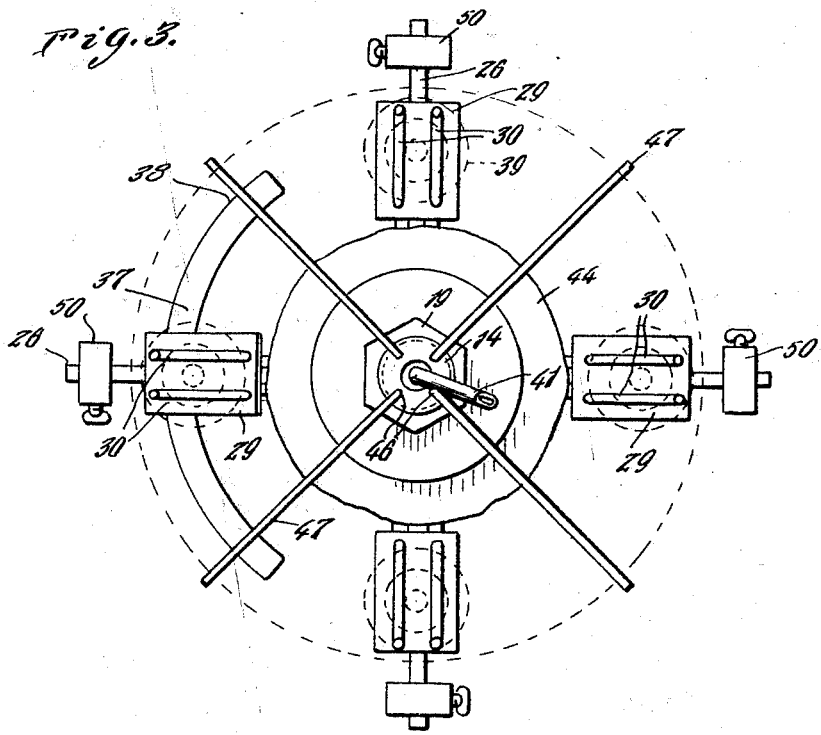
Figure 3 is a sectional view approximately on the line 3—3 of Figure 4, looking in the direction of the arrows.
Figure 4:
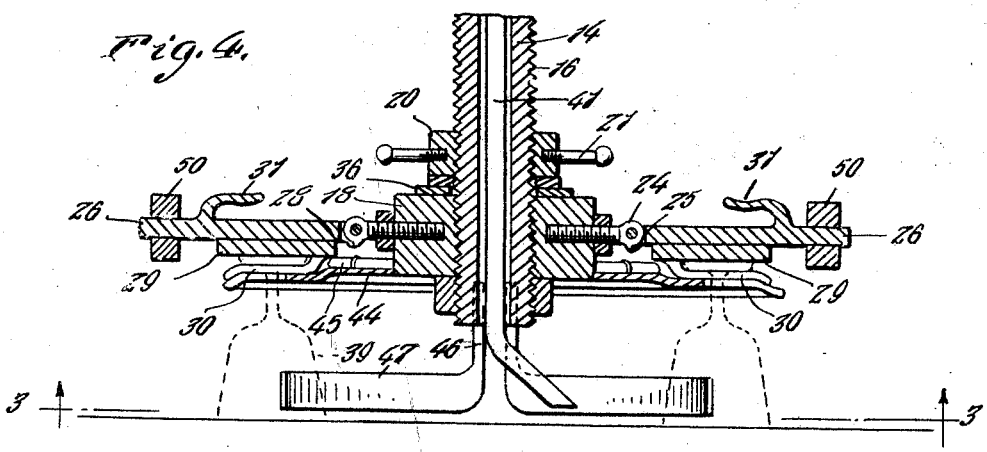
Figure 4 is a sectional view approximately on the line 4—4 of Figure 1.

In the drawings, the numeral 7 indicates the horizontally arranged roughing plate on the mill. The roughing plate is in the nature of a round table and is mounted for turning in the usual manner. Fixed on the frame of the mill there is what I will term an auxiliary frame or support, which in the showing of the drawings is of substantially rightangular construction and which is broadly indicated by the numeral 8. The horizontal member of the frame 8 is disposed in a line parallel with and at a distance above the roughing table 7, and this element of the frame has arranged thereon upstanding bearings 9 for the shaft 10 on one end of which there is fixed a drive pulley 11 and on the other end a pinion 12. By reference to the drawings it will be seen that the horizontal element of the frame 8 extends beyond the center of the roughing table 7, and journaled through suitable bearings 13 in this portion of the frame there is a hollow shaft 14. The shaft 14 has affixed to its upper or outer end a hub of a beveled gear 15 which is in mesh with the pinion 12.

The hollow shaft 14, at a suitable distance below its lower bearing 13 is exteriorly threaded, as indicated by the numeral 16. Mounted on the threaded portion 16 of the shaft 14 there is a cylindrical head 18. Screwed on the shaft and contacting with the under face of the head 18 there is a nut 19, and likewise screwed on the shaft and contacting with the upper face of the head 18 there is a second and binding nut 20. This nut is preferably provided with radially disposed outstanding arms 21 whereby the nut may be readily adjusted on the shaft, and by virtue of such adjustment the head 18 may be raised on the shaft, after which the nut 19 is screwed home to contact with the head and to bind the same on the shaft. In this manner it will be noted that the head 18 may be raised and locked on the shaft. By first turning the nut 19 and thereafter the nut 20 the head may be lowered on the shaft. By reference to the drawings it will be seen that the shaft and the head 18 are disposed beyond the center of the roughing plate or table 7.

Screwed in rightangularly arranged openings in the head 18 there are bolts 22, and these bolts have threaded thereon lock nuts 23 which contact with the periphery of the head. The bolts have outer rounded headed portions 24 provided with centrally arranged downwardly directed lips 25. The bolts 22 provide the inner elements of the footed glass ware supports. The outer elements of the supports each includes an arm 26 that has an inner widened and bifurcated end to receive therein and to have pivoted thereto the heads of the bolts. The arms provided by the bifurcated ends of the arms 26 are indicated for distinction by the numeral 27, and each is connected by a depending transversely arranged lip 28 designed for contacting engagement with the lips 25 on the bolt members for holding the rods 26 parallel with the bolts. Each arm 26 has either formed therewith or fixed on the under face thereof a block or plate 29 and the under face of each of the plates 29 is provided with a pair of spaced spring fingers 30 whose inner ends are curved to their juncture with the blocks 29. The spring fingers 30 are designed to receive therethrough the stems of the footed glass ware, the base portion or foot of such glassware being brought against the under face of the block 29, it being understood that the fingers 30 are of spring material and exert a slight pressure toward the blocks. It should be stated that the free ends of the fingers 30 are rounded downwardly from the blocks to permit of the free insertion of the footed glassware between the fingers and blocks. Each arm 26 on its upper face and outward of the block 29 has fixedly secured thereon an inwardly directed hook member 31.

Fixedly secured on the outer end of the horizontal element of the frame 8 there is a rod 32. The rod 32 has an outer eye portion, which has screwed therein a binding element 33. The element 33 is designed for frictional engagement with a depending rod 34 that passes through the eye of the rod 32. The lower end of the rod 34 has a laterally extending rightangularly disposed bar or plate 35 affixed thereto. The bar or plate 35 has a collar portion 36 that is received over the head 18, and through which the peripherally rounded nut 20 passes. The bar 35, on its opposite and outer end has preferably integrally formed therewith an arcuate or segmental track 37, the central portion of the said track being straight or horizontal, but the ends thereof are inclined downwardly, as at 38.

The operation of the construction as above described is as follows: The shaft 10 causes the turning of the shaft 14. The footed glassware 39 is arranged in each of the clamps provided by the blocks 29 and the spring fingers 30. The head 18 is adjusted on the shaft 14 so that the edges of the glassware 39 will be brought against the upper face of the roughing plate 7, and onto an abrasive substance which is arranged on the said roughing plate or table. The turning of the shaft will successively bring the hook-like elements 31 on the outer and swingable members of the glassware supports over one end and onto the straightened portion of the track 37, which, of course, elevates the support and the glassware carried thereby. If the glassware has its edge sufficiently ground the same can be removed from the clamp. A further turning of the shaft will cause the finger to gradually move off of the second angle portion 38 of the track 37 and at the same time glassware has its edge brought onto the roughing plate, the swingable element of the support will have its lip 28 contact with the lip 25 of the fixed elements 22 of the support, so that the glassware will not be violently moved onto the roughing table. This, of course, is true when a ground glassware is removed or when glassware to be ground is arranged in the clamp.

Supported on an arm fixed to one of the bearings 9 there is a funnel 40. The outlet spout for the funnel is in the nature of a pipe 41 preferably of lead and which is directed through the hollow shaft 14, and has its lower end bent angularly and disposed over but out of contact with the table 7. Above the funnel 40, but delivering thereto there is suitably supported a conical hopper 42. In this hopper there is fed an abradent such as powdered emery or the like that is delivered in desired quantities through the funnel and through the spout 41 and over onto the roughing table 7. A valve or shutter operated by a handle 43 is preferably provided for the outlet end of the hopper 42.

In order that the abradent will not effect the joints between the swingable sections of the glass support, or as a matter-of-fact, contact with any of the movable parts of the head 18, and likewise to especially protect a footed portion of the glassware from contact with or injury by the abradent I secure on the head, adjacent to the lower face thereof, a disc 44. The disc is flexible and is preferably of rubber. The disc is of a size to underlie the spring fingers 30, and as a matter-of-fact, extends therebeyond so that the footed portions of the glass-ware are covered by the said disc. In order to arrange the disc on the glassware, the said disc, in a line with the blocks 29 is slitted from the periphery thereof as indicated by the numerals 44′ in figure 6 of the drawings, and the said disc, at the opposite sides of the rightangularly arranged longitudinal slits 44′ are slitted transversely. The transverse slits provide therebetween gripping fingers 41″ for effectively engaging with the stems of the glassware and for holding the outer portions of the discs against the footed portions of the glassware. This is one of the important features of the invention. Obviously the disc may be secured on the improvement in a different manner from that described, but also obviously the disc may be located to protect both the machine and the footed portions of the glass-ware.

The construction, operation and advantages of my improvement will, it is thought, be understood and appreciated by those skilled in the art to which the invention relates and that further detailed description will not be required.

Having described the invention, I claim:

1. A means for grinding the edges of footed glassware comprising a roughened plate having a powdered abradent thereon, a vertically disposed rotatable shaft over the plate, a head thereon, glassware supports, each including a fixed element carried by the head and a swingable element secured to the fixed element, clamping means on the swingable element for the glassware, a hooked element on each of the swingable elements, and an arcuate track having downwardly directed ends over which the hooked elements ride on the turning of the shaft, for the purpose set forth.

2. Means for grinding the edges of footed glassware, comprising a roughing plate having a powdered abradent thereon, a vertically disposed rotatable shaft over the plate, a head thereon, means for adjusting the head on the shaft, glassware supports, each including a fixed element adjustably secured on the head and an outer swingable element, means for sustaining the elements in longitudinal alinement, spring clamping fingers on the swingable elements for engaging the glassware, a hook on each of the swingable elements, and an arcuate track having downwardly directed ends over which the hooks ride when the shaft is rotated, for the purpose set forth.

3. Means for grinding the edges of footed glassware, comprising a roughing plate having a powdered abradent thereon, a vertically disposed rotatable shaft over the plate, a head thereon, means for adjusting the head on the shaft, glassware supports, each including a fixed element adjustably secured on the head and an outer swingable element, means for sustaining the elements in longitudinal alinement, spring clamping fingers on the swingable elements for engaging the glassware, a hook on each of the swingable elements, an adjustable weight on each of the swingable elements and an arcuate track having downwardly directed ends over which the hooks ride when the shaft is rotated, for the purpose set forth.

4. Means for grinding the edges of footed glassware, comprising a roughing plate having a powdered abradent thereon, a vertically disposed rotatable shaft over the plate, a head thereon, means for adjusting the head on the shaft, glassware supports, each including a fixed element adjustably secured on the head and an outer swingable element, means for sustaining the elements in longitudinal alinement, spring clamping fingers on the swingable elements for engaging the glassware, a hook on each of the swingable elements, an adjustable weight on each of the swingable elements, a protector disc carried by the head and an arcuate track having downwardly directed ends over which the hooks ride when the shaft is rotated, for the purpose set forth.

5. Means for grinding the edges of footed glassware, comprising a roughing plate having a powdered abradent thereon, a vertically disposed rotatable shaft over the plate, a head thereon, means for adjusting the head on the shaft, glassware supports, each including a fixed element adjustably secured on the head and an outer swingable element, means for sustaining the elements in longitudinal alinement, spring clamping fingers on the swingable elements for engaging the glassware, a hook on each of the swingable elements, and adjustable weight on each of the swingable elements, a protector disc carried by the head, outwardly directed guards carried by the shaft and disposed adjacent to the roughing table, and an arcuate track having downwardly directed ends over which the hooks ride when the shaft is rotated, for the purpose set forth.

6. An attachment for roughing mills for grinding the edges of footed glassware, comprising a pivotally supported roughing plate, a frame, a vertically disposed hollow shaft journaled in the frame and arranged to one side of the center of the roughing plate, a head arranged for vertical movement on the hollow shaft, elements screwed on the hollow shaft and contacting the opposite faces of the head, angularly disposed bolt members screwed into the head having outer head portions formed with downwardly directed lips, arms having bifurcated ends pivotally secured to the heads and having lips for contacting with the lips of said bolts, a block on the under face of each arm, spaced spring fingers on the block for engaging the footed portion of glassware, adjustable weights on the arms, a hook on each arm, an arcuate track adjustably supported between the frame and head and having downwardly inclined ends over which the hooks of each of the arms is designed to ride, a funnel containing an abrasive having its stem passing through the hollow shaft and having an angle end disposed slightly above the roughing table, in combination with means for revolving the hollow shaft.

7. A means for grinding the edges of footed glassware, comprising a roughing plate on which a powdered abradent is arranged, a vertically disposed rotatable shaft over the plate, a head, and swingable supports for the footed portions of glassware carried by the head, a protective disc for the swingable supports, and for the footed portions of the glassware, said disc being of elastic material and having longitudinal peripheral slots to receive the stems of the footed glassware therein and likewise having slots arranged transversely of the longitudinal slots to provide gripping fingers therebetween, a hooked element on each support and an arcuate track having downwardly directed ends over which the hooked elements ride, for the purpose set forth.

In testimony whereof I affix my signature.

HERBERT O. WENTZ.